United States Patent Office 3,577,229
Patented May 4, 1971

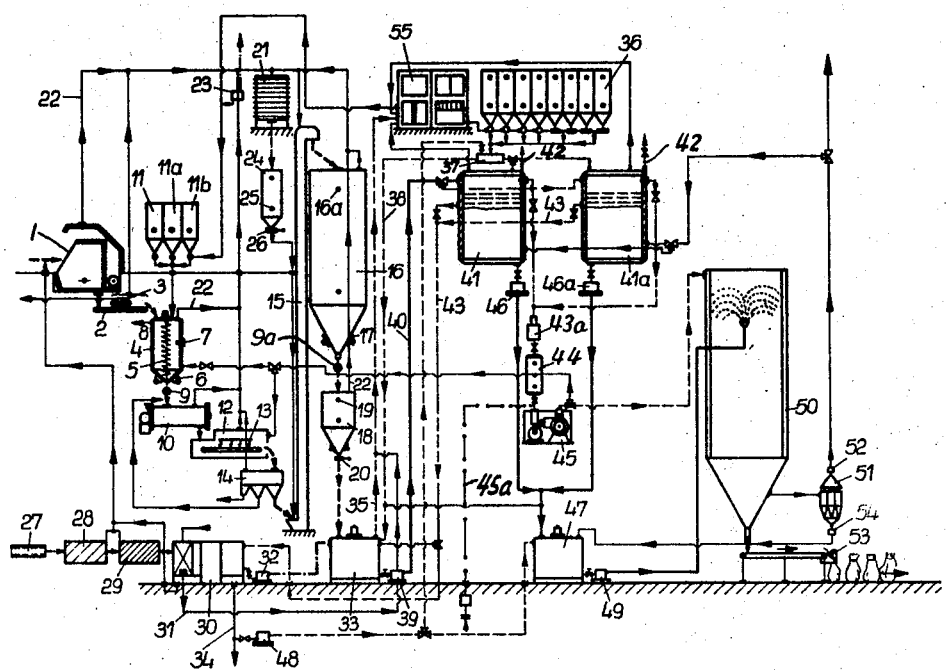

3,577,229
METHOD AND APPARATUS FOR MAKING FERTILIZER
Hans-Erwin Brück, 16 Gartenfeldstr., 55 Trier, Germany
Filed Dec. 26, 1968, Ser. No. 786,984
Claims priority, application Germany, Feb. 23, 1968, P 16 67 788.6
Int. Cl. C05f 7/00
U.S. Cl. 71—9      15 Claims

ABSTRACT OF THE DISCLOSURE

In producing a spreadable grain size fertilizer from a mixture of garbage and fecal matter the garbage is treated to place it in a relatively small grain size after any metallic and fibrous materials have been removed, and the fecal matter, such as in a sewage system, is treated to remove solids, fats and detergents. The treated garbage and fecal matter is mixed as a sludge and is biologically fermented after which water is added to the fermented sludge. After a drying and granulating operation, the fermented sludge is bagged for use as a fertilizer.

SUMMARY OF THE INVENTION

The present invention is directed to the production if a spreadable grain size fertilizer and, more particularly, it is concerned with the formation of a fertilizer from a mixture of garbage and excrement or fecal matter.

In the past it has been known to treat fecal matter in clarification plants and to produce an organic fertilizer for use in improving soil. However, the organic fertilizer formed in this manner has the disadvantage that it is produced in the form of clods or lumps from the dry bed of the clarification plant and when exposed to rain or moisture the fertilizer becomes lumpy and spreads in a lava-like layer which can asphyxiate young plants. This condition is particularly noticeable when the fertilizer is used in steep terrain.

It is well known to dispose of garbage by incineration and, similarly, to treat the incincerated garbage and use it as a fertilizer. Further, treated garbage has been mixed with treated fecal matter to provide a fertilizer of increased efficiency.

Accordingly, it is the prmiary object of the present invention to provide a method of making a spreadable grain size fertilizer from a mixture of garbage and fecal matter.

Another object of the invention is to process the grain sized fertilizer so that it can be easily and efficiency bagged for use at the completion of the method.

Still another object of the invention is to provide a method for separately treating garbage and fecal matter and then mixing the separate components before the final treatment to provide a grain size end product.

Moreover, another object of the invention is to monitor or measure the constituents of the garbage and fecal matter and the combined garbage and fecal matter during the various steps of producing the fertilizer to determine the need for additional materials to assure that the end product has the proper composition for use as a fertilizer.

Accordingly, the garbage is initially treated to remove undesirable components such as metals and fibers and the like, it is ground to a desirable size and then is mixed with fecal matter which has been treated to remove sand and other solid particles and for the liberation of fat, detergents and the like. The mixture of the finely ground garbage and the sludge containing the fecal matter is biologically fermented. After water or sludge liquor is added to the fermented mixture, it is dried and granulated leaving it in a condition to be bagged for use.

Both before and after the mixture of the garbage and the fecal matter, the chemical composition of the components is automatically measured and, if necessary, additional materials are added to assure that the end product contains the proper fertilizing constituents. Moreover, the gas generated in the course of the fermentation step is collected and used in various steps of the process where heat is required.

The various features of novelty which characterize the invention are pointed out with particularity in the claims annexed to and forming a part of this specification. For a better understanding of the invention, its operating advatages and specific objects attained by its uses, reference should be had to the accompanying drawings and descriptive matter in which there is illustrated a preferred embodiment of the invention.

BRIEF DESCRIPTION OF THE DRAWINGS

In the drawings:
The drawing contains a schematic illustration of a fertilizer production plant embodying the present invention.

DETAILED DESCRIPTION OF THE PREFERRED EMBODIMENT

House and industrial garbage, including bulk garbage, is supplied either by truck or railroad to the garbage treatment plant and put into a primary crusher or reducing vessel 1. If it is necessary to do so, the garbage can be dried in an intermediate vessel, not shown, before it is delivered into the reducing vessel. The garbage in the form of a crusted and coarse ground material is discharged from the reducing vessel 1 with a maximum grain size of about 30 mm. The reduced garbage is charged onto a steel plate conveyor belt 2 and passes under a magnet 3. As the garbage passes under the magnet any steel or iron parts are removed and transported to a separate scrap packaging plant, not illustrated.

From the conveyor belt 2 the garbage is delivered into a gas fired intermediate storage vessel 4 having, for example, a capacity of 50 tons. A stirring mechanism 5 is positioned within the vessel 4 to assure that the whole of the garbage is brought in continuous contact with the heated bin wall. At its lower conically shaped end the vessel 4 is provided with a plurality of vibrators 6 arranged to prevent any bridging of the material within the vessel when the ground garbage is being discharged. A hygrometer 7 is located within the intermediate vessel 4 and reports the moisture content of the garbage within the vessel to a control switching station 55 which will be described in greater detail later. Further, an electronic maximum and minimum level indicator 8 is provided within the vessel 4 which cuts off the discharge from the reducing vessel 1 and connects compartmented roll feeder 9 and a pulverizer 10 when the indicator shows that the vessel is full. Moreover, the indicator 8 also actuates all of the series connected units involved in processing the garbage from the pulverizer 10 up to the storage vessel 16. On the other hand, when the minimum level within the vessel 4 is indicated the elements comprising a primary crushing group, that is the reducing member 1, the belt conveyor 2 and the magnet 3, are connected for operation.

As shown in the drawing, a plurality of supply containers 11, 11a, and 11b are positioned above the storage vessel 4. By means of the control switching system 55 materials contained in the supply containers 11, 11a, and 11b are charged into the storage vessel 4 for effecting dehydration, neutralization, disinfection and the like of the ground garbage.

After passing through the pulverizer 10 the garbage enters into a gas fired charging valve 12 combined with a steel plate conveyor and mechanical turnover device 13. The heated charging valve 12 raises the temperature of the garbage to about 250° C. and any textile or other fibers contained in the garbage are charred. From the device 13 the finely ground garbage passes into a classifying and screening machine 14 wherein the garbage is divided into a number of grain size groups. The garbage having a grain size of under 1.0 mm., which amounts to about 80% of the total, is delivered into a chain bucket conveyor 15. Garbage in the range of 1 to 10 mm., which makes up 19.5% or more of the garbage, is fed back into the pulverizer 10 for further reduction in size. The remaining portion of the ground garbage which has a size of greater than 10 mm., which amounts to less than 0.5% of the total, and is comprised of light and nonferrous metal and other ungrindable materials, is discharged from the apparatus.

Within the chain bucket conveyor 15 the garbage having a grain size of less than 1.0 mm. is transported and dumped into a storage container 16 having, for example, a capacity of 300 tons. An electronic maximum and minimum indicator 16a is provided in the storage container 16 and when the maximum level is reached, that portion of the plant extending between the reducing vessel and the storage container 16 is disconnected. When the contents of the container 16 drop to the minimum level, the group of elements from the reducing vessel to the storage container are again placed in operation. Vibrators 17 are placed at the lower conically shaped end of the storage container for uniformly discharging the finely ground garbage into a compartmented roll feeder 9a. Arranged to receive the finely ground garbage from the storage container 16 is a charge vessel 18 also provided with an electronic maximum and minimum level indicator 19. The useful capacity of the charge vessel 18 corresponds to a certain proportion of the output of a dissolver and mixer 33 arranged to receive garbage from the vessel.

When the finely ground garbage has reached the charge vessel 18 its treatment for mixture with the fecal matter has been completed.

To ensure dust free operation of the various pieces of apparatus employed in the treatment of the garbage, a central dust collecting plant 21 is arranged to remove dust from the reducing member 1, the conveyor belt 2, the intermediate storage vessel 4, the pulverizer 10, the heated charging valve 12 and conveyor device 13, the screening machine 14, the chain bucket conveyor 15, the storage container 16, and the charge vessel 18. Waste air containing impurities from the storage vessel 4 and the heated charge valve 12 pass through a separate filter unit 23 before entering the piping system 22 which conveys the dust to the separating plant 21. The filter unit 23 separates toxic components which might be formed during the heating of the garbage.

From the dust collecting plant 21 the dust is fed into a collecting tank 24 which contains an electronic level indicator 25, when the level indicator 25 signals that the tank 24 is full, a pneumatic discharge lock 26 is actuated and the dust is conveyed to the chain bucket conveyor 15. When the tank is emptied the indicator closes the discharge lock.

In the treatment of the fecal matter before its mixture with the finely ground garbage, waste water, such as contained in a municipal or industrial sewage system, is conveyed through a discharge conduit 27 into a coarse screening plant 28 and then into a fine screening plant 29. Solid materials removed or settled out in the screening plants are dried and then charged periodically into the garbage treatment portion of the plant.

The waste water continues from the fine screening plant 29 into an installation 30 wherein the following operations take place: sludge disintegration, fat and detergent neutralization and collection, and sand collection.

An electronic measuring and regulating plant 31 is combined with the installation 30 and is connected to the control switching station 55 which is turn supplies any required components into the sludge from the bunkers 11a and 11b and also from the container group 36.

After it is decomposed and clarified within the installation 30 the waste water sludge is fed by means of the pump into the dissolver and mixer unit 33. The pump is arranged to cut out after a certain amount of the sludge has been delivered into the mixer 33. The fresh sludge basin of the installation 30 is dimensioned in correspondence with the mixer so that when the pumping is discontinued, the excess clarified waste water flows off in a known manner through a discharge passage 34.

In the mixer 33, the ground garbage from the charge vessel 18 and the sludge from the plant 30 are combined. Continuous pH-values and nutrient content are measured in the mixer 33 and are transferred over the line 35 to the control switching station 55. Depending on the nutrient component content, for instance N, $K_2O$, $P_2O_5$, and the like, required for the end product of the process, by means of a programmed selection control arrangement, additional materials can be added into the mixer through pipe line 38 from supply tanks 36. Depending on the suitability and quality of the materials, they are charged into the pipe line 38 by a stirring mechanism 37. The materials delivered into the mixer may be either in solution or in a dry state.

After the finely ground garbage and the fecal matter have been intensively mixed for a period of time, a feed measuring pump 39 is placed in operation and the mixed sludge from the mixer 33 is passed through the line 40 into one of a pair of fermenting towers 41, 41a. The mixing operation within the mixer is continued until at least one or both of the fermenting towers are charged.

The fermenting towers 41, 41a provide either a partial or a full aerobic fermentation. A valve 42 is located at the top of each of the towers 41, 41a for admitting air into the towers to enable an anaerobic as well as a partially or fully aerobic fermentation. Overflow water from the fermenting towers is returned through a pipe line 43 into the clarifying installation 30 or is added into the mixer 33 as necessary for proper operation. Each of the fermenting towers 41, 41a has a heating jacket into which hot waste air at a temperature of about 90 to 100° C. is fed periodically from a cyclone 51 of an atomizing dryer 50. The chemical constituents of the sludge within the fermenting towers is monitored and, as explained previously for other parts of the apparatus, if necessary, materials are added to the sludge within the towers from the tank group 36 controlled by the switching station 55.

During the fermentation process methane gas is generated within the towers 41, 41a and is withdrawn through a conduit into a composer 43a and then supplied into an accumulator 44. From the accumulator 44 the methane gas is supplied to a gas firing plant 45, heating the atomizing dryer 50 and, eventually, the intermediate storage vessel 4 and the heating charging valve 12 for use as a heating medium. Additionally, the gas firing plant 45 is located in a line 45a and, if necessary, gas may be obtained from a municipal system for use in the plant.

After the completion of the biological fermentation within the towers 41, 41a the sludge is fed through the measuring pumps 46, 46a into a tank 47. Within the tank 47 the water content of the sludge is adjusted for the spray drying step and additionally electrolytes and binders are also added. The water needed in tank 47 can be taken from the sewage discharge 34 through a feed pump 48 since the water is sterilized and, as a result, no fresh water may be required.

From the tank 47 a feed pump 49 continuously supplies the sludge to the spray nozzle of the heated atomizing drier 50 which is of a known design. Interconnected with the atomizing drier 50 is a cyclone 51 through which dust collected in the drying operation is returned by means of the fan 54 into the tank 47. The granular material formed by the spray or atomizing drying operation is collected in the bottom of the drier 50. The granular material is odor free, uniformly spherical, and has a diameter of up to 2.5 mm. and a moisture content of approximately 5 to 10%. From the bottom of the dried granular material is ready to be filled into bags. At the discharge end of the drier 50 an automatic bag filling machine 53 is arranged to package the grain sized fertilizer.

The automatic electric control switching station 55 is equipped with a mimic diagram which gives the operator a complete picture of the automatic operation of the plant.

In producing fertilizer it has been found advantageous to charge the treated garbage and the clarified sludge into the mixer 33 in the ratio of 4 to 6 parts garbage to one part clarified sludge. To the sludge issuing from the fermenting towers 41, 41a about 25% water is added within the tank 47 in addition to the electrolytes and binders. This clarifying water can be taken from the sewage pipe, or, if the supply of water is insufficient, then additional fresh water can be added into the tank 47.

What is claimed is:

1. A method of producing a spreadable grain size fertilizer from a mixture of garbage and fecal matter, comprising the steps of treating arbage to reduce it to a relatively small grain size including reducing the garbage to a selected maximum grain size, removing metallic components from the reduced garbage, discharging the granular garbage into a heated storage volume, removing the garbage from the heated storage volume and pulverizing the garbage, effecting dehydration, neutralization and disinfection of the pulverized garbage, introducing a source of waste water containing fecal matter, removing solid materials from the waste water and charging the solid materials into the garbage for processing in the garbage treating steps, treating the fecal matter in the waste water for liberating fat and detergents therefrom and for forming a sludge, selectively adding materials to the sludge for adjusting the contents of the sludge in accordance with the final end product desired, mixing the treated grain size garbage and the treated sludge to form a mixed sludge, biologically fermenting the mixed sludge, adjusting the water content of the mixed sludge, and subsequently atomizing and spray drying the mixtured sludge in a heated atmosphere within a spray drying tower for forming a granular material of spherical form for use as a fertilizer.

2. A method, as set forth in claim 1, comprising the step of removing the dust generated in the treating of the garbage, and discharging the collected dust into a storage space in the system prior to mixing the garbage with the fecal matter.

3. A method, as set forth in claim 1, comprising, after mixing the treated garbage and sludge, the step of measuring the pH-value and the nutrient contents of the mixed sludge and based on the measurements adding material to the mixed sludge for adjusting the pH-value and nutrient components of the end product of the method.

4. A method, as set forth in claim 1, comprising the step of monitoring the contents of the mixed sludge during the biological fermentation step and adding material to the mixed sludge during fermentation to provide the desired constituent parts in the end product.

5. A method, as set forth in claim 1, comprising the step of removing methane gas generated within the fermentation step and employing the gas for supplying heat to the various steps of the method.

6. A method, as set forth in claim 1, comprising the step of mixing the sludge and the garbage in a ratio of 4 to 6 parts garbage to 1 part sludge.

7. A method, as set forth in claim 1, characterized therein by regulating the moisture content of the garbage within the heated storage volume.

8. A method, as set forth in claim 7, comprising the step of monitoring the level of the garbage within the heated storage volume for selectively initiating and discontinuing the charging of the material into the storage volume.

9. A method, as set forth in claim 7, comprising, after pulverizing the garbage, heating the pulverized garbage to about 250° C. for charring any textile and similar fibers in the garbage.

10. A method, as set forth in claim 9, comprising, after the charring of the fibers, the step of classifying the ground garbage into grain sizes of under 1.0 mm., 1 to 10 mm. and greater than 10 mm.

11. A method, as set forth in claim 10, comprising the step of delivering the garbage of a grain size of less than 1.0 mm. into a storage space for subsequent mixture with the fecal matter, monitoring the level of the finely ground garbage within the storage space for selectively operating the supply of the material into and out of the storage space.

12. A method, as set forth in claim 10, comprising the step of returning the garbage having a grain size of 1 to 10 mm. into the pulverizing step and discharging the garbage having a size greater than 10 mm. from the system for producing the fertilizer.

13. A method, as set forth in claim 1, characterized therein that in the spray drying step the spherically shaped granular material has a diameter of up to 2.5 mm. and a moisture content of about 5 to 10%.

14. A method, as set forth in claim 13, comprising the step of collecting the granular material from the drying step and automatically bagging the material.

15. Apparatus for producing a spreadable grain size fertilizer from a mixture of garbage and waste water containing fecal matter, comprising means for reducing the garbage to a selected maximum grain size, a magnetic member for removing iron and steel parts from the reduced garbage, a heated storage vessel for the reduced garbage, a conveyor for transporting the reduced garbage past said magnetic member and for supplying it into said heated storage vessel, a pulverizer arranged to receive the garbage from said heated storage vessel and for finely grinding the garbage, a heated charging valve arranged to receive the finely ground garbage from said pulverizer, and means arranged to receive the finely ground garbage from said charging valve for classifying the garbage into different grain sizes, a conduit for supplying waste water containing fecal matter, a screen device arranged to receive the waste water from said conduit for removing solid materials therefrom, an installation arranged to receive the waste water from said screening device for effecting sludge disintegration, fat and detergent neutralization and collection, and sand collection, means for adjusting the constituent parts of the garbage and the fecal matter in accordance with the end product fertilizer to be produced, a mixer for mixing the finely ground garbage and treated sludge containing fecal matter to achieve a mixed sludge, fermentation towers for biologically fermenting the sludge, conduit means for transporting the mixed sludge from said mixer to said towers, means for adjusting the chemical constitutents of the mixed sludge within said fermenting towers, means for collecting the gas generated within said fermenting towers comprising an accumulator for collecting the gas, a gas firing plant for receiving gas from said accumulator and for supplying heat therefrom to selected elements of the apparatus, a tank arranged to receive the fermented mixed sludge from said fermenting towers, means associated with said tank for adjusting the water content of said mixed sludge, a heated atomizing dryer, a feed pump for feeding the mixed sludge from said tank into said atomizing dryer, and a cyclone device for collecting dust from said atomizing dryer, and said heated atomizing dryer forming an enclosed spray drying tower arranged for spray drying the mixed sludge and forming a spherically shaped granular particle fertilizing product suitable for immediate bagging.

References Cited

UNITED STATES PATENTS

| | | | |
|---|---|---|---|
| 2,929,688 | 3/1960 | Riker et al. | 23—259.1 |
| 2,977,214 | 3/1961 | McLellan | 71—64 |
| 3,138,448 | 6/1964 | Schulze | 71—9 |
| 3,236,604 | 2/1966 | Pierson | 71—9 |
| 3,246,954 | 4/1966 | Redman | 71—9 |
| 3,285,732 | 11/1966 | Schulze | 71—9 |

REUBEN FRIEDMAN, Primary Examiner

C. H. HART, Assistant Examiner

U.S. Cl. X.R.

23—259.1; 71—10, 12, 14